United States Patent [19]

Kobayashi et al.

[11] 4,399,791
[45] Aug. 23, 1983

[54] AIR-FUEL MIXTURE CONTROL FOR AUTOMOBILE ENGINE HAVING FUEL INJECTION SYSTEM

[75] Inventors: Kazuo Kobayashi; Hideki Tanaka; Katsuyoshi Iida; Junji Kamite, all of Hiroshima, Japan

[73] Assignee: Toyo Kogyo Co., Ltd., Hiroshima, Japan

[21] Appl. No.: 294,506

[22] Filed: Aug. 20, 1981

[30] Foreign Application Priority Data

Sep. 6, 1980 [JP] Japan .................. 55-123796

[51] Int. Cl.³ .................. F02M 25/06; F02B 3/08; F02D 17/00
[52] U.S. Cl. .................. 123/489; 123/568; 123/571
[58] Field of Search ............ 123/489, 571, 568, 491, 123/440, 480, 492

[56] References Cited

U.S. PATENT DOCUMENTS

| 4,163,435 | 8/1979 | Nakajima et al. | 123/571 |
| 4,214,563 | 7/1980 | Heraka | 123/489 |
| 4,224,912 | 9/1980 | Taoraka | 123/568 |
| 4,289,108 | 9/1981 | Shioyama | 123/571 |
| 4,304,210 | 12/1981 | Hayakawa | 123/571 |
| 4,337,740 | 7/1982 | Sigarawa et al. | 123/568 |

Primary Examiner—Raymond A. Nelli
Attorney, Agent, or Firm—Wenderoth, Lind & Ponack

[57] ABSTRACT

An air-fuel ratio control system for an automobile engine of a type having a fuel injection system wherein at least two of parameters including the engine speed, the opening of a throttle valve and the negative pressure developed inside a fuel intake passage are utilized to detect the rate of flow of incoming air to be mixed with an injected mist of fuel to form a combustible mixture. The fuel injection system includes a fuel adjusting device so designed as to provide, when the engine operates within a particular operating region, the combustible mixture of an air-fuel mixing ratio lower than that to be supplied to the engine when the latter operates within the other operating region than the particular operating region. The control system comprises a first EGR control device for controlling an EGR control valve according to a control value stored in a memory when the engine operates within the particular operating region and a second EGR control device operable when the engine operates within the other operating region for controlling the EGR control valve in dependence on the concentration of a component of exhaust gases sensed by a composition sensor.

3 Claims, 9 Drawing Figures

AIR-FUEL MIXTURE CONTROL FOR AUTOMOBILE ENGINE HAVING FUEL INJECTION SYSTEM

BACKGROUND OF THE INVENTION

The present invention generally relates to an air-fuel mixture control for an automobile engine of a type having a fuel injection system and, more particularly, to the air-fuel mixture control system effective to compensate for variation in air-fuel mixing ratio of a combustible mixture by properly controlling the rate of recirculation of exhaust gases from an engine exhaust system into an engine fuel intake system in dependence on an output signal from a composition sensor for detecting the concentration of a component of exhaust gases which concentration is a function of the air-fuel mixing ratio of the combustible mixture burned in the engine.

An automobile engine of a type having a fuel injection system is well known. In this engine, an air-flow meter is installed on a fuel intake passage of the engine at a position upstream of a fuel injection nozzle with respect to the direction of flow of a combustible mixture towards the engine. The air-flow meter is used to detect, and generate an output signal indicative of, the rate of flow of incoming air which is subsequently mixed with an injected fuel to form the combustible mixture, which output signal is utilized to control the rate of supply of fuel to be injected into the engine fuel intake passage through the fuel injection nozzle. The use of the air-flow meter is advantageous in that, since the rate of supply of the fuel can be controlled in dependence on the output signal from the air-flow meter, the air-fuel mixing ratio of the combustible mixture can accurately be controlled. An example of this is disclosed in the Japanese Laid-open Patent Publication No. 53-32232 and No. 53-32233, both laid open to public inspection on Mar. 27, 1978, and corresponding to the U.S. Pat. No. 4,163,435, patented Aug. 7, 1979.

However, it has been fairly recognized that, the engine of the type having the fuel injection system requires the increased manufacturing cost because both of the fuel injection nozzle and the air-flow meter are expensive.

What appears to substantially eliminate the above described disadvantage is a control system wherein a combination of at least two of easily detectable parameters including the engine speed (number of revolution of the engine), the negative pressure inside the fuel intake passage and the opening of a throttle valve is utilized in a computer to calculate the rate of supply of incoming air so that the rate of supply of fuel which subsequently mixed with the incoming air can be controlled in correspondence with the rate of supply of the incoming air.

Where an exhaust gas recirculation system for recirculating a portion of the exhaust gases from the exhaust passage back to the intake passage for suppressing the maximum combustion temperature is provided in the engine utilizing the fuel injection system and also utilizing the air-fuel ratio control system wherein at least two of the parameters are used to compensate for variation in the air-fuel mixing ratio of the combustible mixture, such as taught by the U.S. Pat. No. 4,163,435 in view of the Japanese Laid-open Patent Publication No. 50-32327, laid open to public inspection on Mar. 29, 1975, the combustible mixture tends to be enriched because a portion of the incoming air flowing through the intake passage towards the engine is substituted by the exhaust gases recirculated through the EGR system. Therefore, in this possible arrangement, means is required to compensate for variation in the air-fuel mixing ratio which would result from the recirculation of the exhaust gases.

In order to compensate for variation in the air-fuel mixing ratio resulting from the recirculation of the exhaust gases, the conventional procedure is such as to calculate according to a control map stored in a computer, the required amount of the exhaust gases to be recirculated appropriate for a particular engine operating condition on the basis of the parameters representative of such engine operating condition, and then to control the opening of an EGR control valve disposed on an EGR passage so as to satisfy the required amount of the exhaust gases to be recirculated while a fuel adjusting means is so adjusted as to inject fuel into the intake passage at a rate or amount corresponding to the amount of the exhaust gases to be recirculated in anticipation that the exhaust gas recirculation would take place as required by the operation of the EGR control valve.

However, since this conventional method is not based on the practical amount of the exhaust gases recirculated, this conventional method involves such a disadvantage that, even though the opening of the EGR control valve is accurately map-controlled, deviation of the amount of the exhaust gases being recirculated from the required value by reason of, for example, clogging of the EGR passage results in variation of the air-fuel mixing ratio which ought to have been compensated for. Therefore, with this conventional method, an accurate control of the air-fuel mixing ratio to a stoichiometric value can not be performed.

This disadvantage may be eliminated if the amount of the exhaust gases being actually recirculated is detected to provide a reference necessary to determine the rate of supply of the fuel to be injected into the intake passage, or necessary to perform a feedback control to cause the actual amount of the exhaust gases recirculated to approximate to the required amount of the exhaust gases. However, in order to achieve this, the use of the expensive air-flow meter and/or an EGR detecting system for detecting the amount of the exhaust gases actually recirculated is required, rendering the system as a whole to be costly.

In view of the above, we have previously proposed an improved air-fuel ratio control system wherein a fuel adjusting means is provided for determining the amount of fuel to be injected by calculating from a combination of at least two of such parameters representative of an engine operating condition as the engine speed, the negative pressure and the opening of the throttle valve and wherein the air-fuel mixing ratio of the combustible mixture which has been determined by a combination of the amount of the incoming air, the amount of the fuel injected and the amount of the exhaust gases actually recirculated is detected by a composition sensor disposed on the exhaust passage, an output signal from which sensor is used to accurately control the amount of the exhaust gases to be recirculated, that is, to institute a feedback control so as to render the amount of the exhaust gases to be recirculated to be of a value approximating to the required amount of the exhaust gases.

For this purpose, the composition sensor effective to detect whether the combustible mixture burned in the engine has been enriched or leaned is utilized to detect variation in the air-fuel mixing ratio resulting from the recirculation of the exhaust gases, an output signal of said composition sensor being supplied to a computer as information so that the computer can control the EGR control valve according to such information so as to increase or decrease the amount of the exhaust gases to be recirculated in correspondence with the amount of deviation of the actual air-fuel mixing ratio from a predetermined air-fuel mixing ratio, whereby the air-fuel mixing ratio of the combustible mixture to be supplied towards the engine can be controlled to the predetermined or stoichiometric value.

SUMMARY OF THE INVENTION

The present invention is based on our previously proposed concept and has been developed with a view to substantially eliminating such disadvantages and inconveniences as hereinbelow discussed.

Since the air-fuel mixing ratio determined by the fuel adjusting means in dependence on the detected rate of flow of the incoming air (which air-fuel mixing ratio is hereinafter referred to as "base A/F ratio,") approximates to the predetermined or stoichiometric air-fuel mixing ratio where the base A/F ratio is so selected as to become slightly lower than the predetermined value during a particular engine operating condition, including low load and high load operating conditions and the cold start of the engine, in order to secure a good drivability of the engine during such particular operating condition, the control system designed for controlling the actual air-fuel mixing ratio to the predetermined value by adjusting the flow of the exhaust gases being recirculated involves such a problem that no exhaust gas recirculation take place actually and, therefore, the emision of the $NO_x$ component of the exhaust gases cannot be suppressed by the exhaust gas recirculation during the particular engine operating condition.

In order to substantially eliminate the above discussed problem, the present invention is such that a control means for controlling the electromagnetic valve assembly is constituted by first and second EGR control means. The first EGR control means is operable during the particular engine operating condition to determine the opening of the EGR control valve assembly according to a control value read out from a memory means wherein such control value corresponding to the particular operating condition is stored, so that the exhaust gases to be recirculated can be obtained in an amount necessary to suppress the emission of the $NO_x$ component independently of the control or the air-fuel mixing ratio by the EGR system. On the other hand, the second EGR control means is operable during an engine operating condition other than the particular operating condition to effect a feedback control to the EGR control valve assembly in dependence on an output signal from the composition sensor so that the air-fuel mixing ratio can be controlled to the predetermined value by controlling the amount of the exhaust gases to be recirculated.

BRIEF DESCRIPTION OF THE DRAWINGS

These other objects and features of the present invention will become clear from the following description taken in conjunction with a preferred embodiment of the present invention with reference to the accompanying drawings, in which.

DETAILED DESCRIPTION OF THE INVENTION

Figure 1:
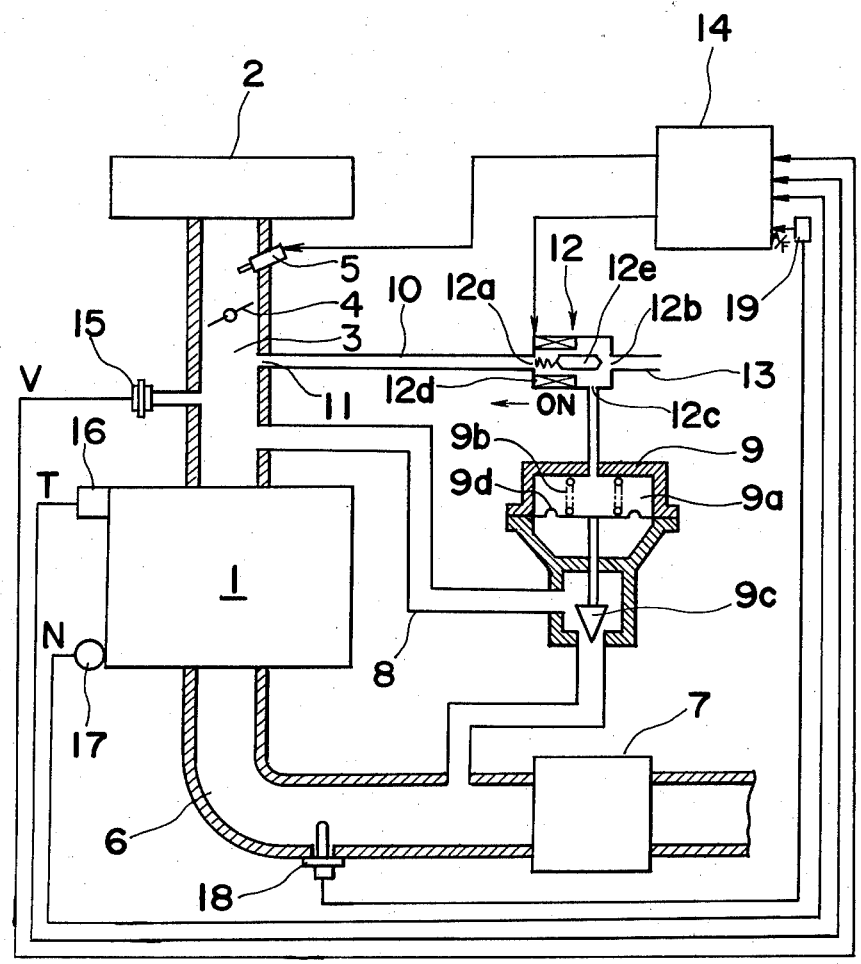
FIG. 1 is a schematic diagram showing an air-fuel ratio control system embodying the present invention.

Before the description of the invention proceeds it is to be noted that like parts are designated by like reference numerals throughout the accompanying drawings.

Referring first to FIG. 1, an automobile power plant comprises an internal combustion engine 1 having at least one combustion chamber communicated on the one hand to the atmosphere through an intake passage 3 by way of an air cleaner 2 and on the other hand to the atmosphere through an exhaust passage 6 by way of an exhaust gas purifying unit 7 in the form of, for example, a catalytic converter. The intake passage 3 has a throttle valve 4 supported therein for movement between substantially closed and full open positions for regulating the flow of a combustible air-fuel mixture towards the engine 1, and a fuel injection nozzle 5 positioned upstream of the throttle valve 4 with respect to the direction of flow of the air-fuel mixture towards the engine 1 for injecting a mist of fuel into the intake passage 3.

The automobile power plant also comprises an exhaust gas recirculating (EGR) system including an exhaust gas recirculating passage 8 having one end communicated to a portion of the exhaust passage 6 between the engine 1 and the catalytic converter 7 and the other end communicated to the intake passage 3 at a position downstream of the throttle valve 4 with respect to the direction of flow of the air-fuel mixture towards the engine 1, and an EGR control valve 9 in the form of a diaphragm valve assembly installed on the EGR passage 8 for regulating the flow of exhaust gases from the exhaust passage 6 back into the intake passage 3 through said EGR passage 8 in dependence on engine operating conditions as will be described later. The EGR control valve has a working chamber 9a defined in a valve casing by a disphragm member 9d, said diaphragm member 9d being displaceable to move a valve member 9c, coupled thereto for movement together with the diaphragm member 9d, between opened and closed positions. The EGR control valve 9 also has a biasing spring 9b housed within the working chamber 9a and biasing the diaphragm member 9d to move the valve member 9c to the closed position in which the recirculation of the exhaust gases through the EGR passage 8 is interrupted.

The EGR control valve 9 is controlled by a negative pressure developed inside the intake passage 3 at a position downstream of the throttle valve 4 and, for this purpose, the working chamber 9a of the EGR control valve 9 is communicated through a pressure transmitting passage 10 to a port 11 opening into the intake passage 3 at a position downstream of the throttle valve 4. The pressure transmitting passage 10 has a three-way electromagnetic valve assembly 12 disposed thereon and comprising a valve casing having three ports 12a, 12b and 12c defined therein. The port 12a is in communication with a portion of the pressure transmitting passage 10 adjacent the intake passage 3, the port 12b is in communication with the atmosphere through an air duct 13, and the port 12c is in communication with a portion of the pressure transmitting passage 10 adjacent the EGR control valve 9. The valve assembly 12 also comprises a solenoid 12d and a valve member 12e normally held in position to close the port 12b, but capable of being moved towards the left as viewed in FIG. 1, to close the port 12a when the solenoid 12d is electrically energized in a manner as will be described later. In practice, this three-way electromagnetic valve assembly 12 is so designed as to adjust the magnitude of the negative pressure to be introduced into the working chamber 9a of the EGR control valve 9 by allowing air to enter the pressure transmitting passage 10 during the movement of the valve member 12e from the right towards the left as viewed in FIG. 1 as a result of the energization of the solenoid 12d. Therefore, it has now become clear that the opening of the EGR control valve 9, and thus the effective cross-sectional area of the EGR passage 8, can be adjusted by the magnitude of the negative pressure introduced into the working chamber 9a of the EGR control valve, which magnitude is in turn adjusted by the valve assembly 12.

Both the amount of fuel to be injected into the intake passage 3 through the injection nozzle 5 and the duty cycle of the electromagnetic valve assembly 12 (which duty cycle represents the ratio, expressed as a percentage, of the time t during which the port 12a is opened relative to the time $\tau$ during which the port 12a is closed, namely $\tau/t \times 100$. The first and second times t and $\tau$ are hereinafter referred to as on-time and off-time of the valve assembly 12, respectively.) are controlled by a microcomputer 14.

The air-fuel mixing ratio control system embodying the present invention includes the following sensors, outputs of all of which are supplied to the microcomputer so that the air-fuel mixing ratio of the combustible mixture to be supplied to the engine 1 can be ultimately controlled to a stoichiometric valve at all engine operating conditions for the purpose of minimizing both the fuel consumption and the emission of pollutants contained in the exhaust gases.

(a) A pressure sensor 15 disposed on the intake passage 3 at a position downstream of the throttle valve 4 for detecting, and generating an output signal indicative of, the negative pressure V developed inside the intake passage 3.

(b) A temperature sensor 16 for detecting, and generating an output signal indicative of, the temperature T of a coolant water used to cool the engine 1.

(c) An engine speed sensor 17 operatively coupled to a power output shaft (not shown) of the engine 1 for detecting, and generating an output signal indicative of, the number N of revolution of the engine which sensor 14 may be a tachnometer.

(d) A composition sensor 18 disposed on the exhaust passage 6 between the engine 1 and the catalytic converter 7 for detecting, and generating an output signal indicative of, the concentration of a component, for example, oxygen, of the exhaust gases, which concentration is a function of the air-fuel mixing ratio of the combustible mixture which has been combusted in the engine 1.

While the output signals from the respective sensors 15, 16 and 17 are directly fed to the microcomputer 14, the output signal A/F from the composition sensor 18 is fed to a comparison circuit 19 operable to compare the output signal from the composition sensor 18 with a threshold valve representative of a predetermined air-fuel mixing ratio which may be a stoichiometric air-fuel mixing ratio and then to generate a difference signal or air-fuel ratio signal A/F which is applied to the microcomputer 14.

Figure 2:
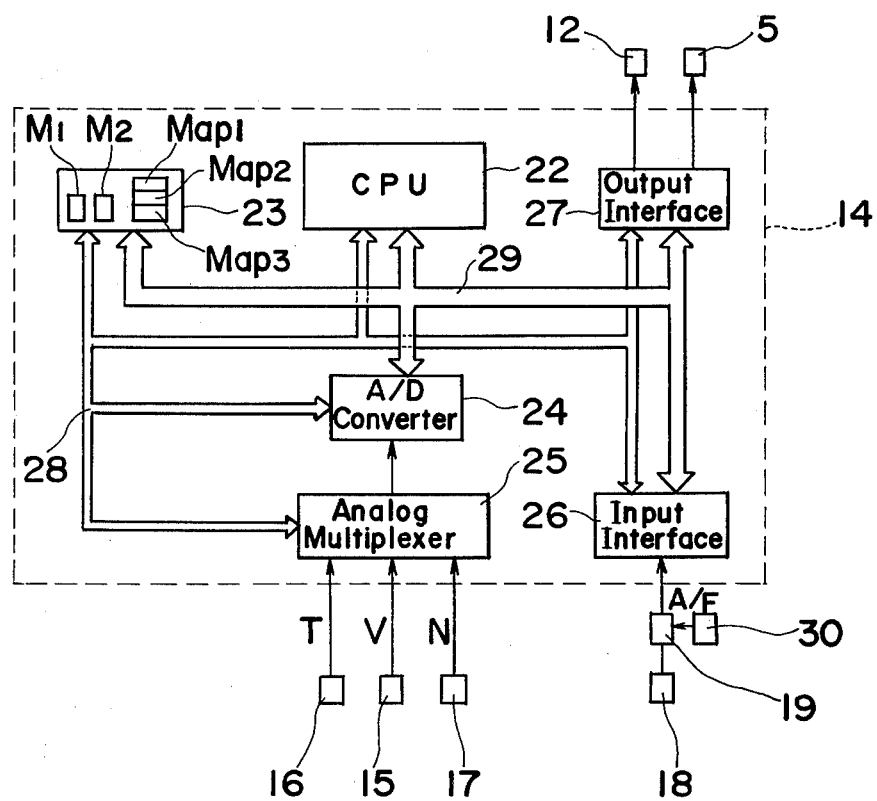
FIG. 2 is a schematic block diagram showing a microcomputer used in the practice of the present invention.

Referring to FIG. 2, the microcomputer 14 comprises a central processing unit 22, a memory 23, an analog-to-digital converter 24, an analog multiplexer 25, an input interface circuit 26, an output interface circuit 27, all of them are connected by control buses 28, the receipt and delivery of address signals and data signals among these components being performed through address/data buses 29. This microcomputer 14 is of any known construction and, therefore, the details thereof will not be herein reiterated for the sake of brevity.

As shown in FIG. 2, the respective output signals from the pressure sensor 15, the temperature sensor 16 and the speed sensor 17 are fed to the analog multiplexer 25. These output signals from the sensor 15, 16 and 17 fed to the analog multiplexer 25 are occasionally read out therefrom and then fed to the central processing unit 22. On the other hand, the air-fuel ratio signal A/F is fed to the input interface circuit 26 and is occasionally fed therefrom to the central processing unit 22.

Figure 3:
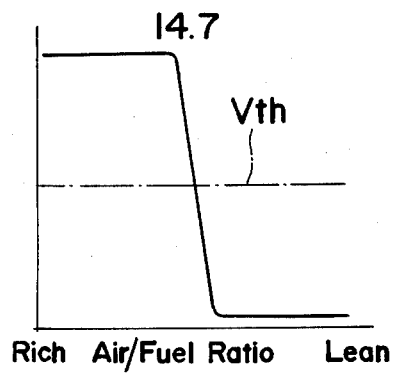
FIG. 3 is a diagram showing the waveform of an output signal from a composition sensor.

In FIG. 2, reference numeral 30 represents a predetermined voltage generator for supplying a voltage signal representative of the threshold value Vth to the comparison circuit 19 whereat the output signal from the composition sensor 18 is compared with the threshold value Vth. The comparison circuit 19 so connected with the predetermined voltage generator 30 serves to determine whether the output signal from the composition sensor 18 is higher or lower than the threshold value Vth as shown in FIG. 3 to find whether the combustible mixture burned in the engine 1 has been enriched or leaned with respect to the stoichiometric air-fuel mixing ratio of, for example, 14.7, the output signal from said comparison circuit 19 being supplied to the microcomputer 14 in the form of the air-fuel ratio signal A/F.

Hereinafter, the manner in which the fuel injection control circuit for the nozzle 5 and the electromagnetic valve assembly 12 are controlled by the microcomputer 14 will be described with particular reference to a flow chart shown in FIG. 4.

Figure 4:
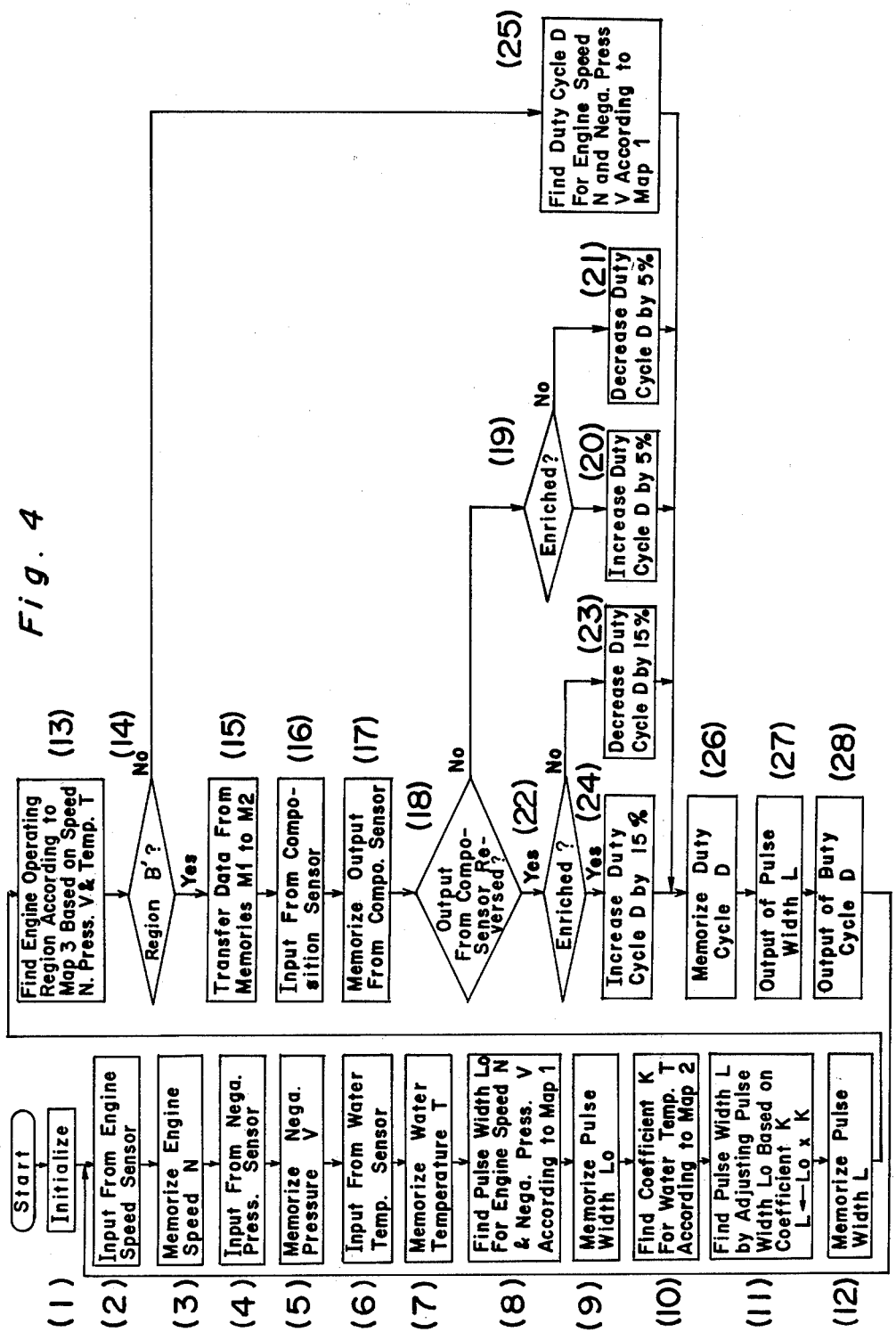
FIG. 4 is a flow chart showing the sequence of control performed by the microcomputer.

Referring to FIG. 4, the microcomputer 14 initialized at the step (1) in response to the application of a start signal thereto performs the following control process at a predetermined cycle.

In the first place, at the step (2), the output signal from the speed sensor 18 is read in and, subsequently at the step (3), the engine speed N is stored at a predetermined address in a first memory area $M_1$ of the memory 23. Thereafter and until the step (7), the output signals from the respective sensors 16 and 17 are sequentially read in with the negative pressure V and the water temperature T memorized correspondingly in a similar manner.

Figure 5:
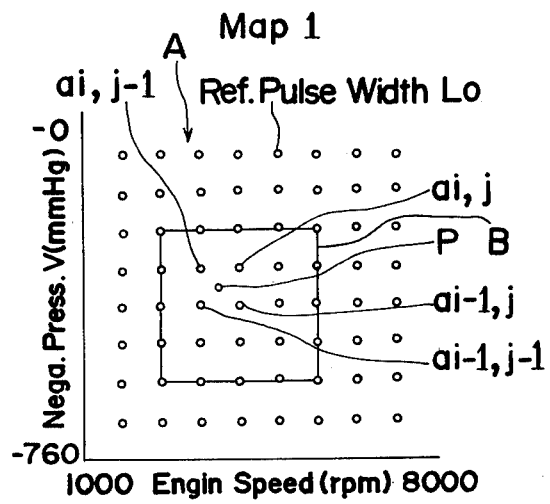
FIG. 5 is an explanatory diagram used to explain a memory Map 1 for setting a reference pulse width to be applied to a fuel injection nozzle.

At the step (8), the width Lo of a reference pulse which provides a reference to a fuel injection control pulse to be applied to the nozzle 5 is calculated from the engine speed N and the negative pressure V on the strength of a memory Map 1 shown in FIG. 5.

The memory Map 1 is a map having a plurality of grid points (ai, j) occupying respective points of intersection of eight lines equally dividing the maximum possible range of variation of the negative pressure V with an equal number of columns dividing equally the range of engine speed N and wherein the value of fuel injection control pulse width Lo, that is, the amount of fuel to be injected into the intake passage 3 through the nozzle 5, determined as appropriate to a particular coordination of the negative pressure V and the engine speed N assigned by the associated grid point (ai, j) is stored at each grid point (ai, j), as shown in FIG. 5. This fuel injection control pulse width Lo, which is hereinafter referred to as reference pulse width, is so selected as to cause the base A/F ratio to be higher than the stoichiometric value in consideration of the compensation of the air-fuel mixing ratio effected by the recirculation of the exhaust gases.

In this case, the memory Map 1 is, as shown in FIG. 5, composed of a particular region A of engine operating condition including low load and high load engine operating conditions and a region B of engine operating condition including a moderate load engine operating condition. The reference pulse width Lo falling within the particular operating region A is so selected that the base A/F ratio is lower than that represented by the reference pulse width Lo falling within the operating region B, whereby not only can a good drivability of the engine during the operating condition within the region A be obtained, but also any possible reduction in combustibility of the engine can be avoided even during the proper exhaust gas recirculation being effected.

Where the point P assigned by the coordination of the negative pressure V and the engine speed N read out from the central processing unit 22 does not match with the grid point (ai, j) as shown in FIG. 5, the reference pulse width Lo(P) corresponding to the point P can be calculated by interpolation on the basis of the four grid points (ai-1, j), (ai-1, j-1), (ai, J-1) and ai, j) all surrounding the point P.

Figure 7:
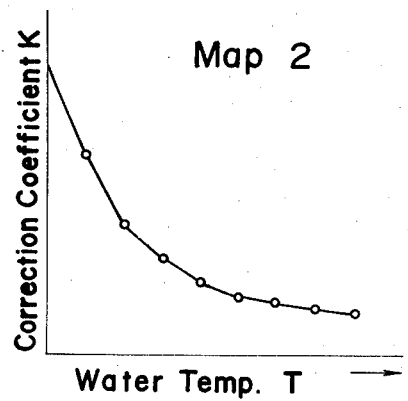
FIG. 7 is an explanatory diagram used to explain a memory Map 2 for the determination of a correction coefficient relative to the reference pulse width.

The reference pulse width Lo(P) so calculated is stored at a predetermined address in the first memory area $M_1$ of the memory 23 during the step (9). At the subsequent step (10), the water temperature T memorized during the step (7) is read out and a correction coefficient K(T) for the water temperature T relative to the reference pulse width Lo(P) is calculated according to a memory Map 2 shown in FIG. 7. The calculated correction coefficient K(T) is then multiplied by the reference pulse width Lo(P), at the step (11), to determine the pulse width $L(=Lo(P)\times K(T))$ of the injection control pulse to be actually applied to the fuel injection nozzle 5, which pulse width L is temporarily stored at a predetermined address in the first memory area $M_1$ of the memory 23 during the step (12).

By so doing, the determination of the injection control pulse width L completes, at the microcomputer starts calculation of the duty cycle D of the electromagnetic valve assembly 12.

For this purpose, subsequent to the determination of the injection control pulse width L and at the step (13), data such as the engine speed N, the negative pressure V and the water temperature T all stored in the first memory area $M_1$ are read out to find the engine operating condition according to a memory Map 3, i.e. to find according to the memory Map 3 whether the engine operating condition falls in a region of high base A/F ratio or whether the engine operating condition falls in a region of low base A/F ratio.

Figure 8:
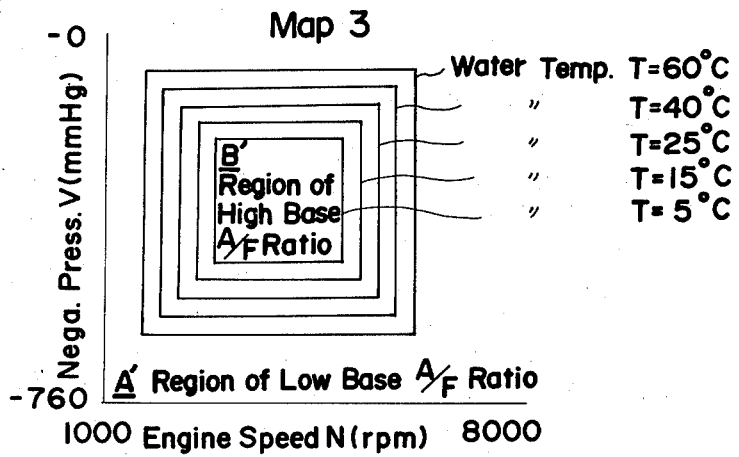
FIG. 8 is an explanatory diagram used to explain a memory Map 3 for setting EGR and EGR-cut regions of engine operating conditions.

The memory Map 3 is, as shown in FIG. 8, composed of separate regions A' and B' corresponding, respectively, to the regions A and B of the memory Map 1. Since the injection control pulse width L, unlike the reference pulse width Lo, has a dependency on the temperature T of the coolant water and since the actual region A' of low base A/F ratio and the actual region B' of high base A/F ratio vary depending on the water temperature T, the boundary between the regions A' and B' has been preset according to the memory Map 1 and the memory Map 2 so that such variation can be determined.

At the step (14), check is made as to whether the engine operating condition then occurring falls within the region A' or the region B' and if it is found as falling within the region B, the step (14) is followed by the step (15) from which a second EGR control means performs a control to feedback the EGR control valve 9. On the contrary thereto, if it is found at the step (14) as falling in the region B', the step (14) is followed by the step (25) from which a first EGR control means operates to control the control valve 9 according to a control value stored in a memory means.

In the second EGR control means, at the step (15), data such as the engine speed N, the negative pressure V, the water temperature T, the reference pulse width Lo, the correction coefficient K, the injection control pulse width L and others, which have been stored in the first memory area $M_1$ of the memory 23 are transferred to the second memory area $M_2$ which is separately provided in the memory 23.

The air-fuel ratio signal A/F from the comparison circuit 20 is read in at the step (16) and is subsequently, i.e., at the step (17) stored in the first memory area $M_1$. At the step (18), the air-fuel ratio signal so stored is compared with the previously stored air-fuel ratio signal, which has been transferred to the second memory area $M_2$, to determine whether or not the air-fuel mixing ratio has been reversed. If it is found that the air-fuel mixing ratio has not been reversed, the step (18) is followed by the step (19), but if it has been found that the air-fuel mixing ratio has been reversed, the step (18) is followed by the step (22). At any one of the steps (19) and (22), the combustible mixture burned in the engine is checked as to whether it has been enriched.

Figure 6:
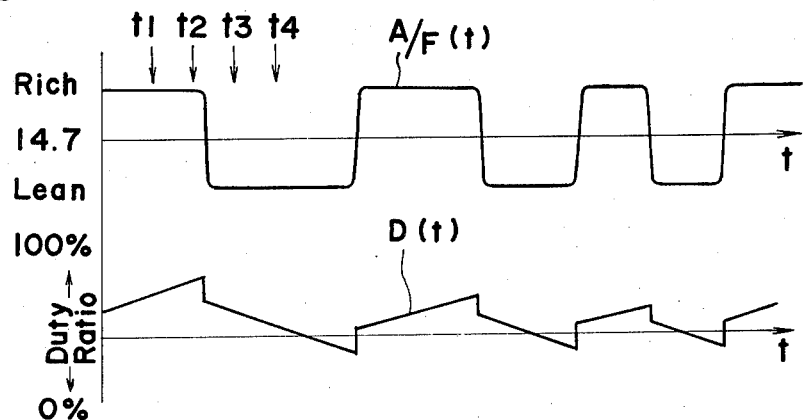
FIG. 6 is a graph showing the relationship between variation in an air-fuel ratio signal and corresponding variation in the duly cycle of an electromagnetic valve assembly.

Specifically, assuming that the air-fuel ratio signal A/F $(t_1)$ read in at a timing $t_1$ shown in FIG. 6 as well as the air-fuel ratio signal A/F $(t_2)$ read in a timing $t_2$ shows that the combustible mixture burned in the engine 1 has been enriched, and assuming that the increment of the previous duty cycle $D(t_1)$ of the electromagnetic valve assembly 12 during a period from the timing $t_1$ to the timing $t_2$ has been, for example, 5%, the succeeding duty cycle $D(t_2)$ is set to a value increased by the increment of 5% relative to the previous duty cycle $D(t_1)$ That is, $D(t_2)=1.05\times D(t_1)$ It is to be noted that, where both of the previous air-fuel ratio signal A/F(t₃) and the next succeeding air-fuel ratio signal A/F(t₄) at respective timings t₃ and t₄ in FIG. 6 show that the combustible mixture has been leaned, the decrement is assumed to be 5% and the next succeeding duty cycle D(t₄) is reduced at the step (21) by the decrement of 5% relative to the previous duty cycle D(t₄). That is, $D(t_4)=0.95 \times D(t_3)$.

On the other hand, where as shown at respective timing t₂ and t₃ in FIG. 6 the previous air-fuel ratio signal A/F(t₂) and the next succeeding air-fuel ratio signal A/F(t₃) are in reversed relation to each other, showing that the combustible mixture has been enriched and leaned at the respective timings t₂ and t₃, at the step (23), the decrement incident to the reversion of the air-fuel mixing ratio during the period from the timing t₂ to the timing t₃ is assumed to be, for example, 15% and the next succeeding duty cycle D(t₃) is set to a value reduced by the decrement of 15% relative to the previous duty cycle D(t₂). That is, $D(t_3)=0.85 \times D(t_2)$.

Figure 9:
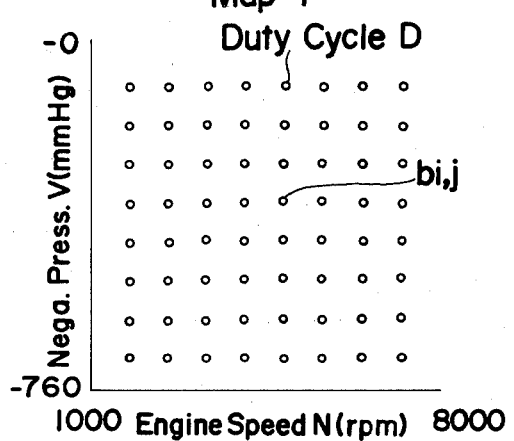
FIG. 9 is an explanatory diagram used to explain a memory Map 4 for setting the duty cycle of an electromagnetic valve assembly.

On the contrary thereto, where the air-fuel ratio signal A/F(t) which has shown at the step (22) that the combustible mixture has been leaned is reversed to show that the combustible mixture has been enriched, the next succeeding duty cycle is set at the step (24) to a value increased by the increment of 15% relative to the previous duty cycle. That is, $D(t_3)=1.15 \times D(t_2)$.

Where the engine operating condition has been found falling in the region A' at the step (14), the first control means supersedes the feedback control, which is effected in dependence on the output signal from the composition sensor 18, to determine the duty cycle D of the electromagnetic valve assembly 12 according to a memory Map 4 shown in FIG. 9.

The memory Map 4 is similar to the memory Map 1 shown in FIG. 5 and is a map in which a plurality of predetermined duty cycles D of the electromagnetic valve assembly 12 appropriate to the engine operating conditions are preset at respective grid points (bi, j) assigned by associated coordinations of the negative pressure V and the engine speed N. It is to be noted that, where a particular engine operating condition does not coincide with any one of the grid points (bi, j), the duty cycle of the electromagnetic valve assembly 12 appropriate to such particular engine operating condition can be calculated by interpolation in a manner similar to that described with reference to FIG. 5.

Accordingly, in the present invention, even when the engine operating condition falls within the region A', the exhaust gas recirculation is not completely interrupted and is effected according to the memory Map 4 separately of the feedback control in dependence on the output signal from the composition sensor 18. Therefore, even though the air-fuel mixing ratio of the combustible mixture to be supplied to the engine 1 during the engine operating condition falling within the region A corresponding to the region A' is set to be low, the exhaust gases can be recirculated in an amount necessary to suppress the emission of the NO$_x$ component irrespective of the setting of the air-fuel mixing ratio.

By so doing, the duty cycle D of the electromagnetic valve assembly 12 so determined at any one of the steps (20), (21), (23), (24) and (25) is stored at the step (26) in the first memory area M₁.

Thereafter, the injection control pulse width L stored in the first memory area M₁ is read out at the step (27) and is, as shown in FIG. 2, applied to the injection nozzle 5 through the interface circuit 27 to cause said nozzle to inject the fuel into the intake passage 3 for a period of time equal to the injection control pulse width L.

Subsequently and at the step (28), an output signal indicative of the calculated duty cycle D for the electromagnetic valve assembly 12 is applied through the output interface circuit 27 to the valve assembly 12 to control the duty cycle of the valve assembly 12 in dependence on the calculated duty cycle D.

As has become clear from the above description, in the case where the engine operating condition falls in the region B', and if it has been found that the actual air-fuel mixing ratio of the combustible mixture monitored by the composition sensor 18 was lower than the stoichiometric value, the duty cycle of the valve assembly 12 is computer-controlled to increase to allow much air to mixing ratio, the duty cycle of the electromagnetic valve assembly 12 is adjusted by the microcomputer 14 to increase. As shown in FIG. 1, the increased duty cycle of the electromagnetic valve assembly 12 allows much air to enter through the port 12b into the EGR passage 10 thereby reducing the negative pressure which has been introduced into the working chamber 9a of the EGR control valve 9. Consequently, as the negative pressure in the working chamber 9a reudces, the biasing spring 9b expands gradually outwardly to displace the diaphragm member 9d to bring the valve member 9c towards the closed position whereby the rate of flow or recirculation of the exhaust gases from the exhaust passage 6 into the intake passage 3 is decreased while the air entering the EGR passage 10 through the port 12b is introduced into the intake passage 3 at a rate corresponding to the rate of reduction of the flow of the exhaust gases through the EGR passage 8. By so doing, the combustible mixture being supplied towards the engine 1 is leaned to attain the stoichiometric valve.

On the contrary thereto, should the output signal from the composition sensor 19 show that the combustible mixture burned in the engine 1 has been leaned relative to the stoichiometric air-fuel mixing ratio, the duty cycle of the electromagnetic valve assembly 12 is decreased thereby to allow much negative pressure to be introduced into the working chamber 9a of the EGR control valve 9. Therefore, in this condition, the diaphragm member 9d is displaced to move the valve member 9c towards the opened position, so that the combustible mixture being supplied towards the engine 1 is enriched in admixture with the recirculated exhaust gas to attain the stoichiometric air-fuel mixing ratio.

On the contrary thereto, in the case where the engine operating condition falls in the region A' corresponding to the particular operating region A, the duty cycle D of the EGR control valve 9 is determined according to the memory Map 4 with the opening of said valve 9 adjusted to a value corresponding to such duty cycle D so that the exhaust gas recirculation can be effected to such an extent that the drivability of the engine 1 will not be hampered, thereby minimizing the emission of the NO$_x$ component during the particular operating region A.

From the foregoing description, it has now become clear that the present invention is such that, when the engine of the type utilizing the fuel injection system including the fuel adjusting means which is computer-controlled by the utilization of at least two parameters including the engine speed, the negative pressure and the opening of the throttle valve is operated under the operating condition falling within the particular operating region, the air-fuel mixing ratio is set to be lower than that during the operating condition falling within the other region than the particular operating region and, on the other hand, these is employed the first EGR control means for controlling the EGR control valve according to the control value, which has been stored in the memory means, when the engine operating condition falls within the particular operating region and the second EGR control means for controlling the EGR control valve according to the feedback scheme in dependence on the output signal from the composition sensor when the engine operating condition falls in the other region than the particular operating region, said first and second EGR control means being selectively brought into operation depending on whether the engine operating condition falls within the particular operation region or other region than the particular operating region.

According to the present invention, even though the air-fuel mixing ratio of the combustible mixture to be supplied to the engine during the engine operating condition falling within the particular operating region is set to be so low as to preserve the drivability of the engine, a necessary exhaust gas recirculation can be carried out with the EGR range expanded and, therefore, the emission of the $NO_x$ component can be suppressed substantially at all engine operating conditions.

Although in the foregoing description the duty cycle of the electromagnetic valve assembly for the particular operating region has been described as determined according to the memory Map 4, it may equally be determined using a predetermined method of calculation.

Although the present invention has fully been described, it is to be noted that various changes and modifications are apparent to those skilled in the art. Such changes and modifications are to be understood as included within the true scope of the present invention unless they depart therefrom.

We claim:

1. An air-fuel ratio control system for an internal combustion engine of a type having a fuel injection system, said control system comprising, in combination:

a fuel intake passage having an injection nozzle for injecting a mist of fuel thereinto for the preparation of a combustible mixture in admixture with incoming air flowing therethrough and a throttle valve;

an exhaust passage means for the discharge of exhaust gases from the engine towards the atmosphere;

an EGR passage means for providing communication between the intake passage means and the exhaust passage means for recirculating a portion of the exhaust gases from the exhaust passage means into the intake passage means;

an EGR control valve means disposed in said EGR passage means for controlling the rate of flow of that portion of the exhaust gases;

a composition sensor disposed in the exhaust passage means for detecting the concentration of a component of the exhaust gases which is a function of the air-fuel mixing ratio of the combustible mixture burned in the engine;

a fuel adjusting means for controlling the amount of fuel to be injected into the intake passage means in dependence on the rate of flow the incoming air through the intake passage means, said rate of flow of the incoming air being detected by a combination of at least two of parameters including the engine speed, the negative pressure developed inside the intake passage means at a position downstream of the throttle valve with respect to the direction of flow of the combustible mixture towards the engine and the opening of the throttle valve, said fuel adjusting means being so adjusted that the air-fuel mixing ratio of the combustible mixture to be supplied to the engine when the engine operates within a particular operating region is lower than that to be supplied to the engine when the latter operates within the other operating region than said particular operating region;

a first EGR control means for controlling the EGR control valve means according to a control value stored in a memory means when the engine operates within the particular operating region; and a second EGR control means operable when the engine operates within said other operating region for controlling the EGR control valve means in dependence on the concentration of the exhaust gas component detected by the composition sensor.

2. A system as claimed in claim 1, wherein said particular engine operating region includes a low load operating condition and a high load operating condition of the engine.

3. A system as claimed in claim 1, wherein said particular engine operating region includes a cold start of the engine.

* * * * *